(12) United States Patent
Jain et al.

(10) Patent No.: US 10,635,597 B2
(45) Date of Patent: Apr. 28, 2020

(54) READ CACHING WITH EARLY REFRESH FOR EVENTUALLY-CONSISTENT DATA STORE

(71) Applicant: Citrix Systems, Inc., Fort Lauderdale, FL (US)

(72) Inventors: Ayush Jain, North Lauderdale, FL (US); Steven A. Keller, Coral Springs, FL (US); Nishil Prajapati, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 59 days.

(21) Appl. No.: 15/908,002

(22) Filed: Feb. 28, 2018

(65) Prior Publication Data

US 2019/0266097 A1    Aug. 29, 2019

(51) Int. Cl.
| | |
|---|---|
| *G06F 12/0891* | (2016.01) |
| *G06F 3/06* | (2006.01) |
| *G06F 12/0871* | (2016.01) |
| *G06F 12/0866* | (2016.01) |
| *G06F 12/0888* | (2016.01) |

(52) U.S. Cl.
CPC ........ *G06F 12/0891* (2013.01); *G06F 3/0611* (2013.01); *G06F 12/0866* (2013.01); *G06F 12/0871* (2013.01); *G06F 12/0888* (2013.01); *G06F 2212/151* (2013.01); *G06F 2212/154* (2013.01); *G06F 2212/222* (2013.01); *G06F 2212/264* (2013.01); *G06F 2212/466* (2013.01)

(58) Field of Classification Search
CPC ... G06F 12/08; G06F 12/0888; G06F 12/0891
See application file for complete search history.

(56) References Cited

U.S. PATENT DOCUMENTS

| | | | |
|---|---|---|---|
| 9,208,104 B2 | 12/2015 | Cao et al. | |
| 9,390,131 B1 | 7/2016 | Fuller | |
| 9,489,306 B1 * | 11/2016 | Murugesan | ......... G06F 12/0815 |

(Continued)

FOREIGN PATENT DOCUMENTS

| | | |
|---|---|---|
| CN | 106446037 | 2/2017 |
| CN | 107133369 | 9/2017 |

OTHER PUBLICATIONS

PCT/US2019/016102, Notification of Transmittal of the International Search Report and the Written Opinion of the International Searching Authority, or the Declaration, 14 pages, dated Apr. 10, 2019.

*Primary Examiner* — Pierre Miche Bataille
*Assistant Examiner* — Andrew Russell
(74) *Attorney, Agent, or Firm* — BainwoodHuang (57) ABSTRACT

A technique for managing a read cache in an eventually-consistent data store includes, in response to a read request for a specified data element, receiving the specified data element from the read cache as well as a remaining TTL (time to live) of the data element, as indicated by a timer for that data element in the read cache. If the remaining TTL falls below a predetermined value, the technique triggers an early refresh of the specified data element, prior to its expiration. Consequently, later-arriving read requests to the same data element that arrive before the data element has been refreshed experience cache hits, thus avoiding the need to perform their own time-consuming refresh operations.

18 Claims, 4 Drawing Sheets

(56) References Cited

U.S. PATENT DOCUMENTS

| | | |
|---|---|---|
| 9,600,514 B2 | 3/2017 | Hugg |
| 9,613,104 B2 | 4/2017 | Smith et al. |
| 9,747,339 B2 | 8/2017 | Andleman et al. |
| 2003/0188106 A1 | 10/2003 | Cohen |
| 2016/0275085 A1 | 9/2016 | Soundararajan et al. |
| 2017/0353577 A1 | 12/2017 | Lutz et al. |

* cited by examiner

READ CACHING WITH EARLY REFRESH FOR EVENTUALLY-CONSISTENT DATA STORE

BACKGROUND

Eventually-consistent data stores are common components of distributed systems. As is known, an "eventually-consistent data store" is one that allows certain representations of data to fall behind most recent updates. For example, a distributed data store may maintain multiple versions of a particular data element in different locations. Rather than requiring all versions of that data element to be identical at all times, eventual consistency allows certain versions to lag behind. For example, it may be perfectly acceptable for different versions of a data element to be out of sync with one another for several minutes. In a busy, distributed system, eventual consistency helps to avoid chatter among different nodes and high latency in response times, as the nodes merely require their data to be consistent eventually, rather than immediately.

Eventually-consistent data stores commonly employ read caches to improve performance. For example, a distributed, eventually-consistent data store may employ a centralized read cache, which provides requestors with quick access to frequently-used data elements. To promote fast responses, the read cache may implement semiconductor memory or fast, nonvolatile memory. The read cache connects to slower, persistent storage, which maintains more permanent copies of data elements and typically has a much larger storage capacity than the read cache.

Some read caches employ a timeout policy for data eviction. For example, whenever a read cache loads a data element from persistent storage, the read cache assigns the data element an initial time to live (TTL), which immediately begins counting down to zero. The data element expires when the TTL reaches zero. If a client later requests the expired data element, the read cache signals a cache miss and reloads the requested data element from persistent storage. The cache again sets a timer for the requested element, which again starts counting down to zero. This arrangement ensures that data can circulate into and out of the cache, and that the data in the cache does not fall behind the corresponding data in persistent storage by more than the initial TTL.

SUMMARY

Unfortunately, the above-described eviction policy for a read cache in an eventually-consistent data store suffers from deficiencies. For example, in response to a read request for a data element that has expired from the read cache, resulting in a cache miss, the act of refreshing the data element from persistent storage can take a significant amount of time, on the order of seconds in some cases. This delay is much longer than the typical response time for accessing an unexpired data element from the read cache, which may be on the order of tens of milliseconds. Further, if additional read requests arrive during the time period when the expired data element is being refreshed, each of those additional read requests will also experience a cache miss, triggering an independent refresh of the same data element. As a result, many consecutive read requests may be delayed, and end-user experience suffers. Not only can delays be long, but they can also be inconsistent, as some read requests are responded to quickly while others take much longer.

In contrast with this prior approach to read caching, an improved technique for managing a read cache in an eventually-consistent data store includes, in response to a read request for a specified data element, receiving the specified data element from the read cache as well as a remaining TTL (time to live) of the data element, as indicated by a timer for that data element in the read cache. If the remaining TTL falls below a predetermined value, the technique triggers an early refresh of the specified data element, prior to its expiration. As a result, later-arriving read requests to the same data element which arrive before the data element has been refreshed experience cache hits, as the data element has not expired, thus avoiding the need to perform their own time-consuming refresh operations. The overall result is greater consistency in response times to read requests, as the number of read requests that trigger cache refreshes is greatly reduced.

Certain embodiments are directed to a method of managing a read cache for an eventually-consistent data store. The method includes directing the read cache to store multiple data elements backed by persistent storage. The read cache is configured to invalidate each of the data elements upon expiration of a respective timer provided for the data element. The method further includes issuing, by a software application running on a server computer, a read request to the read cache to read a specified data element, the read request returning (i) the specified data element and (ii) a remaining TTL (time to live) of the specified data element in the read cache as indicated by the timer for the specified data element. The method still further includes performing, by the software application, a testing operation configured to (i) produce a first result in response to the remaining TTL of the specified data element being less than a predetermined value and (ii) produce a second result in response to the remaining TTL for the specified data element being greater than the predetermined value. In response to the testing operation producing the first result, the method still further includes issuing an early-refresh instruction to the read cache. The early-refresh instruction is configured to refresh the specified data element with fresh contents from the persistent storage prior to expiration of the timer for the specified data element.

Other embodiments are directed to a computerized apparatus constructed and arranged to perform a method of managing a read cache for an eventually-consistent data store, such as the method described above. Still other embodiments are directed to a computer program product. The computer program product stores instructions which, when executed on control circuitry of a computerized apparatus, cause the computerized apparatus to perform a method of managing a read cache for an eventually-consistent data store, such as the method described above.

In some examples, after issuing the early-refresh instruction but prior to the specified data element being refreshed in the read cache, the software program issues a set of additional read requests to the read cache for the specified data element. In response to issuing each of the additional read requests, the software program receives the specified data element from the read cache before having refreshed the specified data element in the read cache from the persistent storage.

In some examples, issuing the early-refresh instruction to the read cache causes the timer for the specified data element to be reset.

In some examples, the timer for the specified data element has an initial TTL from which the timer counts down, and the predetermined value is based on a TTL greater than zero and less than the initial TTL.

In some examples, when issuing the early-refresh instruction, an early-refresh lock is established. The early-refresh lock prevents each of the set of additional read requests from completing an early-refresh instruction as long as the early-refresh lock remains active.

In some examples, the early-refresh lock is explicitly released after the specified data element has been refreshed with fresh contents from the persistent storage.

In some examples, the early-refresh lock is stored as a data element in the read cache. The data element has a lock timer, and the early-refresh lock is configured to release automatically upon expiration of the lock timer.

In some examples, the software program accesses the specified data element from the read cache using a key, and a key is established for the early-refresh lock based on the key for the specified data element.

In some examples, issuing the read request by the software program is performed in response to receipt of a data request from a client machine coupled to the server computer over a network, and the specified data element received in response to the read request is returned to the client machine in response to the data request.

In some examples, issuing the read request by the software program is performed in response to receipt of a data request from a client machine coupled to the server computer over a network, and the technique further includes receiving, by the software program, the fresh contents of the specified data element from the persistent storage, and returning, to the client machine, the fresh contents of the specified data element in response to the data request.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for managing a read cache in an eventually-consistent data store includes, in response to a read request for a specified data element, receiving the specified data element from the read cache as well as a remaining TTL (time to live) of the data element, as indicated by a timer for that data element in the read cache. If the remaining TTL falls below a predetermined value, the technique triggers an early refresh of the specified data element, prior to its expiration. Consequently, later read requests to the same data element that arrive before the data element has been refreshed experience cache hits, thus avoiding the need to perform their own time-consuming refresh operations.

Figure 1:
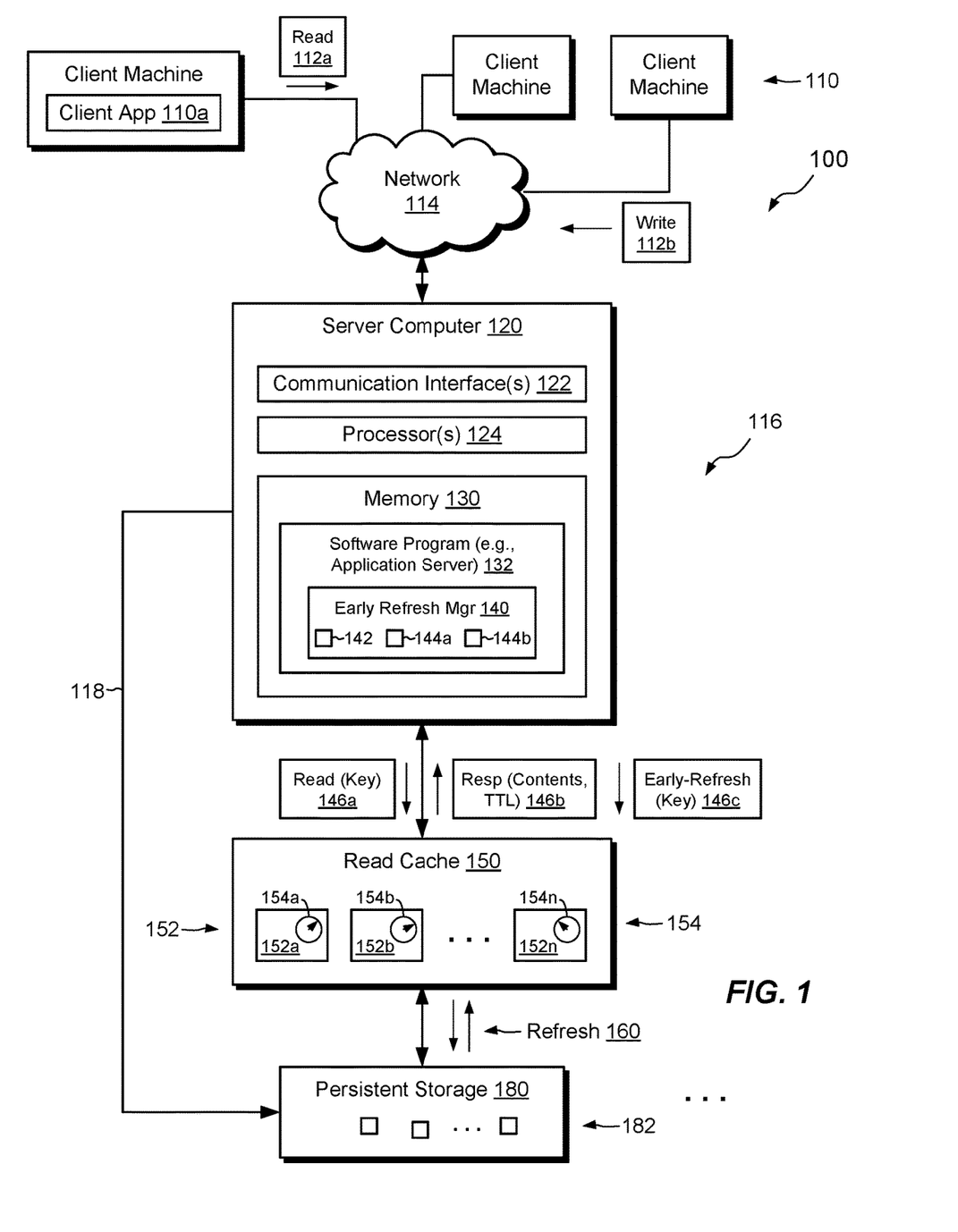
FIG. 1 is a block diagram of an example environment in which embodiments of the improved technique hereof can be practiced.

FIG. 1 shows an example environment 100 in which embodiments of the improved technique hereof can be practiced. Here, one or more client machines 110 are coupled to a server computer 120 over a network 114. The network 114 may be any type of network or combination of networks, such as a local area network (LAN), a wide area network (WAN), the Internet, and/or some other type of network or combination of networks, for example. The server computer 120 is coupled to a read cache 150, which is in turn coupled to persistent storage 180. The persistent storage 180 may be implemented, for example, as any number of magnetic disk drives, solid state drives, electronic flash drives, and the like, for providing nonvolatile storage of arbitrarily large amounts of data. Although the persistent storage 180 is shown as a single entity, it may alternatively be implemented in a distributed fashion, with multiple persistent storage nodes coupled to the read cache 150, e.g., over the network 114 or some other network. In an example, the server computer 120, read cache 150, and persistent storage 180 form an eventually-consistent data store 116 and store data elements that are accessible by client machines 110, which may be operated by users.

In various examples, the read cache 150 is implemented as a dedicated server, in a virtual machine, or in any form that provides a suitably large amount of memory for caching recently used data elements in the persistent storage 180. The memory supporting the read cache 150 may be high-speed, volatile memory, such as DRAM, but no particular form of memory is required. In some examples, the read cache 150 is implemented as a Redis Cache, an Oracle In-Memory Cache, an Apache Ignite In-Memory Data Grid, a custom-built cache, or some other type of cache. In some examples, the read cache 150 is incorporated within the server computer 120, e.g., in a virtual machine that runs on the server computer 120. No particular hardware configuration is required, however, as the arrangement shown in FIG. 1 is intended merely to be illustrative.

In the example shown, the read cache 150 stores data in the form of data elements 152, e.g., as data elements 152a-152n, where "n" can be any positive integer. Each of the data elements 152 has an associated timer 154, e.g., 154a-154n, where each timer 154 specifies a time to live (TTL) of the respective data element 152. For example, each timer 154 has an initial TTL value (e.g., 3 minutes, 5 minutes, etc.), which is set when the corresponding data element 152 is read into the read cache 150, and which counts down to zero. When the TTL for a data element 152 reaches zero, the respective data element 152 expires and becomes invalid, at which point the data element is considered to be evicted from the read cache 150. In an example, the read cache 150 stores data elements as key-value pairs, where each data element 152 has a unique key, which uniquely defines an address in the read cache 150 at which the data element can be found.

The server computer 120 includes one or more communication interfaces 122, a set of processors 124, and memory 130. The communication interfaces 122 include, for example, network interface adapters for converting electronic and/or optical signals received over the network 114 into electronic form for use by the server computer 120. The set of processors 124 includes one or more processing chips and/or assemblies. The memory 130 includes both volatile memory, e.g., Random Access Memory (RAM), and non-volatile memory, such as one or more Read-Only Memories (ROMs), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a software program 132, such as an application server, which is configured to operate in coordination with application clients 110a running on client machines 110. The software program 132 includes an early-refresh manager 140, which is configured to trigger early refreshes of data elements held in the read cache 150.

In example operation, client machines 110 issue data requests to access data elements stored in the eventually-consistent data store 116. When a data request 112a specifying a read arrives at the server computer 120 from a client machine 110, the software program 132 forwards the data request 112a as a read request 146a to the read cache 150. In an example, the software program 132 provides the key for the specified data as part of the read request 146a.

The read cache 150, upon receiving the read request 146a, performs a lookup of the data element having the specified key and provides either a cache hit or a cache miss. A cache hit indicates that the read cache 150 holds the requested data, whereas a cache miss indicates that the read cache 150 does not hold the requested data. In the event of a cache hit, the read cache 150 responds to the read request 146a by returning the specified data element 152, i.e., the one having the specified key. The read cache 150 also returns a remaining TTL of the specified data element 152, i.e., the time remaining on the timer 154 for the specified data element. In the event of a cache miss, for example, the read cache 150 fetches the specified data element from the persistent storage 180 (e.g., from among data elements 182), creates a new data element 152 that stores the fetched data element, and sets the timer 154 to the initial value. One should appreciate that timers 154 for different data elements 152 may have different initial values, which may be set, for example, by the software program 132.

Client machines 110 may also issue data writes 112b to the eventually-consistent data store 116. In some examples, data writes 112b bypass the read cache 150, and instead propagate (as write requests 118) directly to the persistent storage 180. Thus, a situation can arise in which a data element 182 in the persistent storage 180 has more recent contents than a corresponding data element 152 in the read cache 150. In accordance with eventually-consistent design principles, however, this inconsistency poses no immediate problem, provided that the data elements are eventually made consistent. By forcing the data elements 152 in the read cache 150 to expire upon their respective timer TTLs reaching zero, the read cache 150 ensures that no data element 152 falls farther behind the corresponding data element 182 in persistent storage 180 by an amount of time greater than the initial TTL.

Assume now that a client machine 110 issues a data request 112a to read data that corresponds to data element 152a in the read cache 150. In response to receipt of the data request 112a, the software program 132 issues a read request 146a and receives back a response 146b. The response 146b provides the contents of data element 152a and the remaining TTL of data element 152a as indicated by timer 154a. In accordance with particular improvements hereof, the early refresh manager 140 checks the remaining TTL that was returned in the response 146b and performs a testing operation. The testing operation compares the remaining TTL with a predetermined value 142. The testing operation is configured to produce a first result 144a if the remaining TTL is less than the predetermined value 142 and to produce a second result 144b if the remaining TTL is greater than the predetermined value 142. If the testing operation produces the first value, then the software program 132 proceeds to issue an early-refresh instruction 146c, requesting that the data element 152a be refreshed early (arrows 160), i.e., before expiration of the timer 154a. In response to the early-refresh instruction 146c, the read cache 150 receives, into the data element 152a, a fresh, current version of the corresponding data element from the persistent storage 180. The read cache 150 also resets the timer 154a to the initial TTL. If the testing operation produces the second value, indicating that the remaining TTL is greater than the predetermined value 152, then the software program 132 merely returns the contents of the data element 152a to the requestor and performs no early refresh. In a non-limiting example, the predetermined value 142 may be set to approximately half the initial TTL of the data element. For example, if the initial TTL is 5 minutes, the predetermined value 142 may be set to 2.5 minutes. Under these conditions, if the remaining TTL is less than 2.5 minutes, the software program 132 issues an early-refresh instruction 146c. Otherwise, it does not.

A significant feature of the arrangement of FIG. 1 is that early-refresh instructions 146c proceed only if there is a demand for the requested data. Early refresh is thus not automatic for a data element but is rather triggered by receipt of a read request 112a to access that data element. This arrangement ensures that data elements are allowed to expire from the read cache 150 if they are not accessed within their remaining TTLs. Allowing unrequested data elements to expire from the read cache 150 avoids consuming the read cache 150 with data that clients do not require and thus helps to make efficient use of cache memory resources.

Because there may be significant delays in accessing the persistent storage 180, the act of refreshing the contents of the data element 152a may take up to a second or more to complete. During this time, additional data requests 112a may arrive, which are directed to the data cached in the same data element 152a. Preferably, these additional requests 112a do not trigger their own early-refresh activities, however, as an early-refresh is already in progress and the data element 152a is still present in the read cache 150 (it has not yet expired). Thus, the additional read requests 112a may be satisfied directly from the read cache 150, without the need to access persistent storage 180. Note that this situation is unlike the one described above in connection with the prior approach, where multiple read requests each trigger an independent access to persistent storage even after a first refresh has begun.

In some examples, the software program 132 implements a lock or semaphore to prevent or block additional early-refresh operations on a data element while a first early-refresh operation is in progress. Without such a mechanism, unnecessary early-refresh operations could be performed, which would serve no useful purpose but would unnecessarily increase traffic to the persistent storage 180 and possibly increase delays in responding to data requests 112a.

In some examples, the software application establishes a lock upon issuing a first early-refresh instruction 146c for the data element 152a. The lock has the effect of blocking any later-issued early-refresh instructions 146c on the data element 152a as long as the lock remains active. The first early-refresh instruction 146c can remove the lock once the data element 152a receives the fresh data. Preferably, the lock has a defined expiration, after which time it effectively unlocks itself or deletes, to prevent potential deadlocks that could otherwise result if the early-refresh operation is unable to complete.

Figure 2:
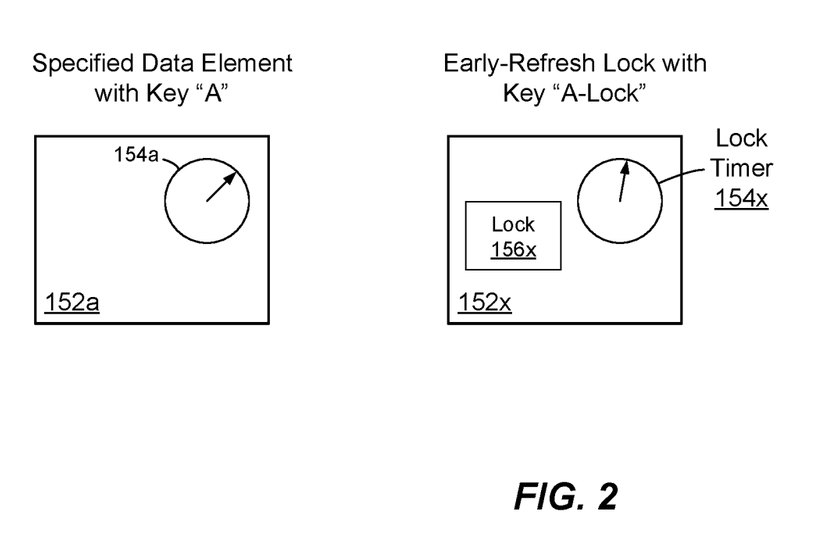
FIG. 2 is a diagram showing an example data element and an example lock for refreshing that data element in a read cache of FIG. 1.

FIG. 2 shows an example locking arrangement that may be suitable for certain embodiments. Here, the software program 132 implements an early refresh lock 156x in a separate data element 152x in the read cache 150. The early-refresh lock 156x may be provided as a Boolean value, such as TRUE for locked and FALSE for unlocked. Like other data elements in the read cache 150, the data element 152x may be established as a key-value pair where the key is known or computable by the software program 132 and the value is the Boolean value of the lock. In a particular example, and for convenience, the key of the early-refresh lock 156x may be established based upon the key for the particular data element for which the early-refresh lock 156x is created. For example, if the early-refresh lock 156x is created to lock out early-refresh operations on data element 152a, and if data element 152a has a key equal to "A," then the key of data element 152x storing the early-refresh lock for data element 152a may be based on "A" in a computable manner. As a simple example, the software program 132 may establish the key for data element 152x as "A-Lock." With this arrangement, the software program 132 can easily create or look up the early-refresh lock associated with any data element just by knowing the key for that data element.

In an example, the data element 152x that stores the early-refresh lock 156x has a timer (lock timer 154x) that has a relatively short initial TTL. For example, the initial TTL of the lock timer 154x is set to a value greater than an expected data refresh time but not excessively long. For example, if the expected refresh time is one second, then the initial TTL of the lock timer 154x may be set to 2 seconds, 3 seconds, etc. Ordinarily, an early-refresh operation can complete prior to the TTL of the lock timer 154a reaching zero. But if an error occurs, e.g., as a result of a disconnected cable, dropped packet, etc., the lock timer 154x expires and the read cache 150 invalidates the early-refresh lock 156x. If the software program 132 later tries to access the early-refresh lock 156x (in data element 152x), no lock will be found, such that another early-refresh instruction 146c will be allowed to proceed.

Figure 3:
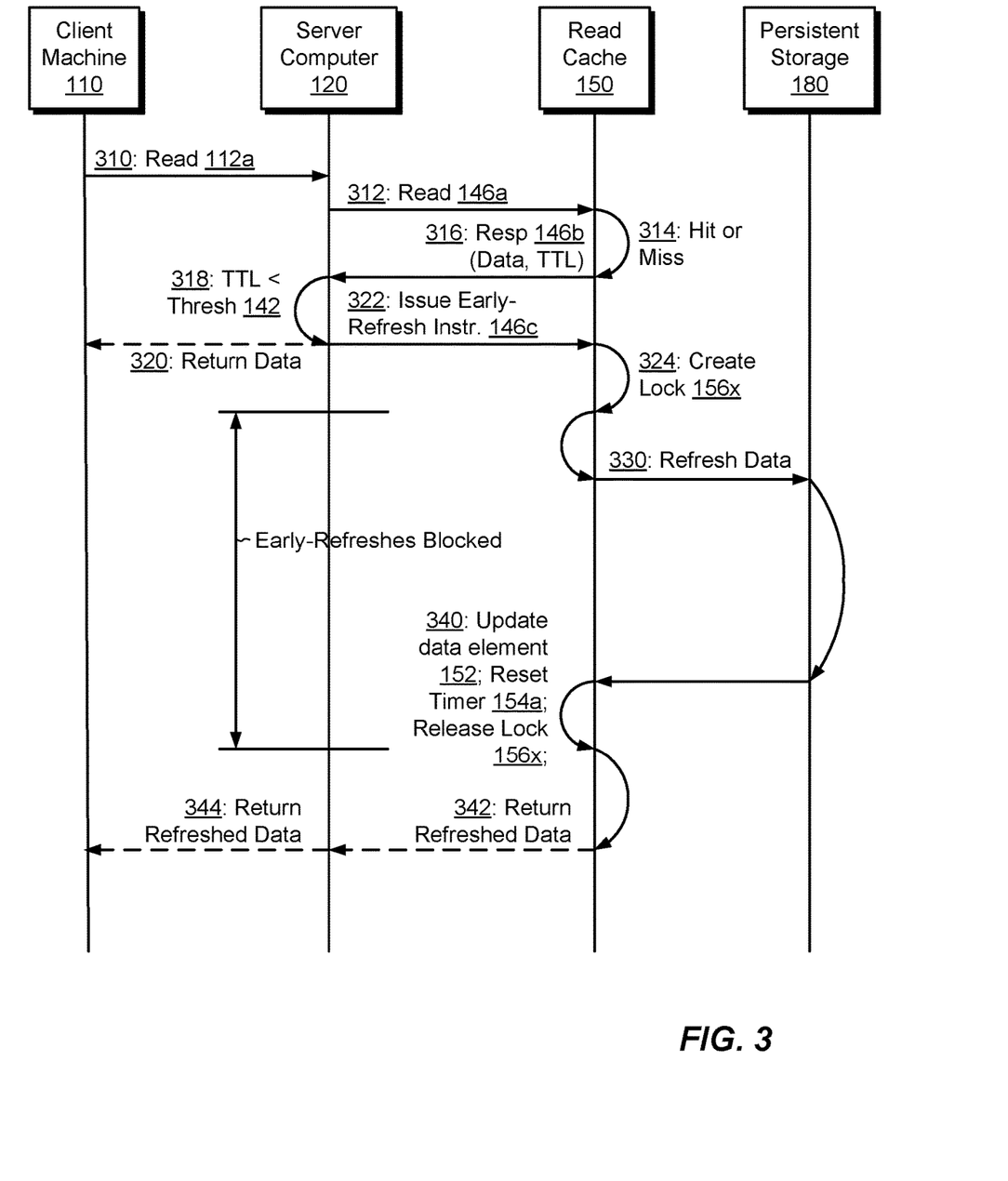
FIG. 3 is a sequence diagram showing an example sequence of events for performing an early refresh of a data element in the read cache of FIG. 1.

FIG. 3 shows an example sequence of activities for performing early refresh in the eventually-consistent data store of FIG. 1. The illustrated activities take place among the client machine 110, server computer 120, read cache 150, and persistent storage 180. One should appreciate that similar results may be accomplished with slight variations to the activities as shown, which are intended to be illustrative rather than limiting. Also, the activities as shown have been simplified for ease of understanding.

The illustrated activities begin at 310, with a client machine 110 issuing a data-read request 112a to the server computer 120. In response, at 312 the server computer 120, e.g., operating under direction of the software program 132, provides a read request 146a to the read cache 150. The read request 146a may include, for example, the key of the requested data in the read cache 150. At 314, the read cache 150 issues a cache hit or a cache miss. The result of a cache miss is not shown, but the ordinary result would be for the read cache 150 to fetch the requested data from persistent storage 180, store the data in a data element in the read cache 150, and return the requested data to the server computer 120.

At 316, and assuming a cache hit, the read cache 150 returns a response 146b to the server computer 120. The response 146b includes the requested data from the read cache 150 and a remaining TTL of the data element 152 that stores the requested data. Upon receiving the response 146b, the server computer 120 performs a testing operation, which compares the remaining TTL with the predetermined value 142 (FIG. 1). If the remaining TTL is less than the predetermined value 142, the server computer 120 issues an early-refresh instruction 146c to the read cache 150 (act 322). The early-refresh instruction 146c may specify the key of the requested data element 152. If the remaining TTL is greater than the predetermined value 142, however, the server computer 120 may simply return the requested data (act 320) to the client machine 110.

In some examples, the server computer 120 may return the requested data at this time even if the remaining TTL is less than the predetermined value 142. For example, returning the requested data, while also issuing the early-refresh instruction 146c, may involve spawning an additional computing thread to carry out the early-refresh instruction 146c (act 322), while an initial computing thread returns the data (act 320). Depending on programmer preference and computing capabilities, it may be desirable to wait for the early-refresh instruction 146c to complete before returning the data to the requestor.

Assuming that the early-refresh instruction is issued (act 322), the software program 132 directs the read cache 150 to create an early-refresh lock 156x (act 324; see FIG. 2). At 330, the sequence performs a data refresh from persistent storage 180. At 340, the read cache 150 receives the updated data into the data element 152. At this time, the read cache 150 also resets the timer 154a to its initial value and releases the lock 156x. Release of the lock 156x is performed explicitly in some examples, but it may be performed implicitly in other examples, as the lock 156x may simply time out and expire on its own.

At 342, and assuming the data were not returned during act 320, the read cache 150 return the refreshed contents of the data element 152 to the server computer 120, which, at 344, returns the same contents to the client machine 110.

One can see that the early-refresh lock 156x has the effect of blocking early-refresh instructions 146c to the data element 152 as long as the early-refresh lock 156x remains active. If additional read requests 112a for the same data element arrive while the early-refresh lock 156x is in place, the additional read requests will fail to refresh data from persistent storage 180, even if they induce early-refresh instructions 146c. Rather, such additional read requests will be satisfied from the read cache 150 directly, as the requested data element has not expired.

Figure 4:
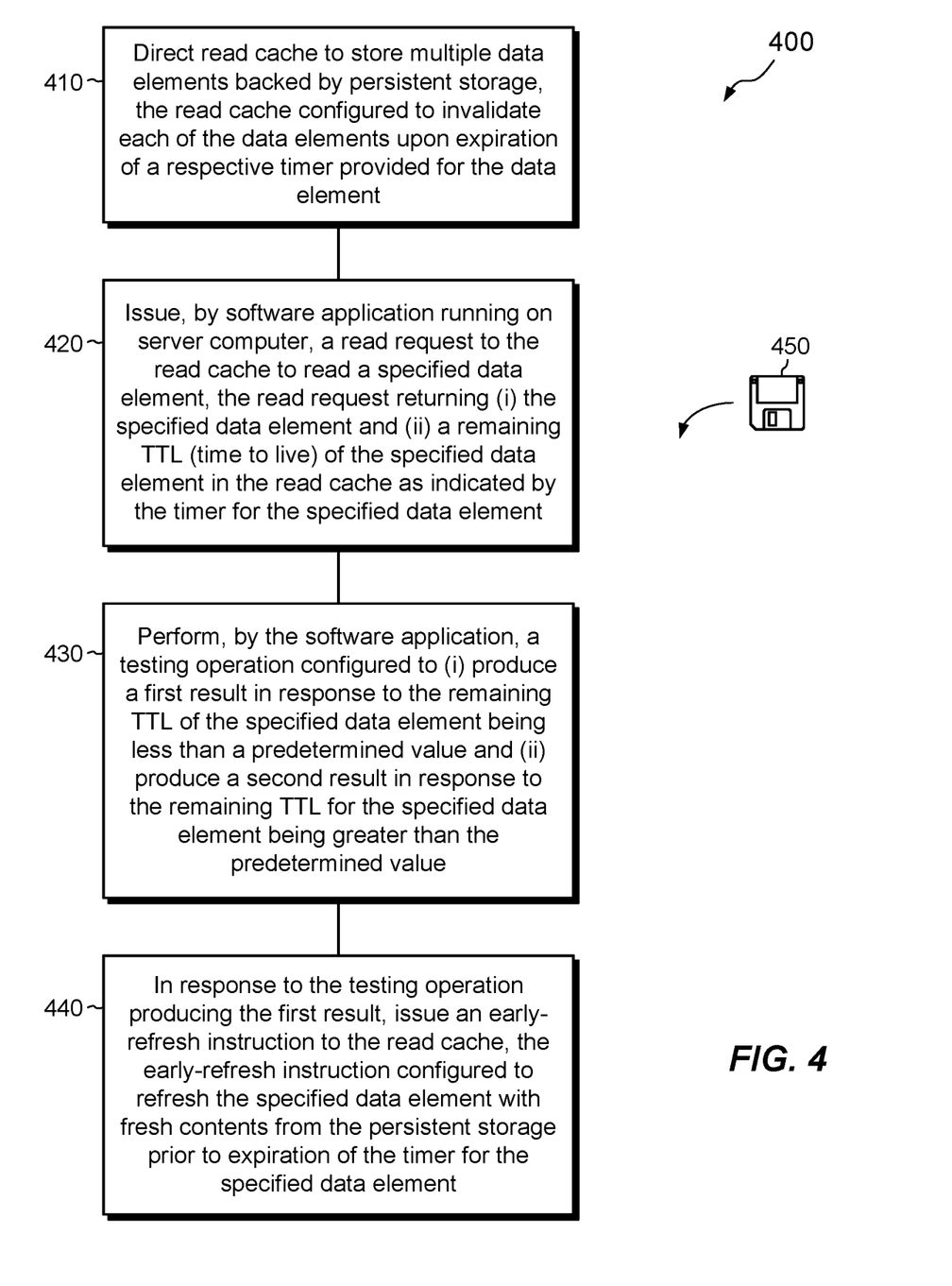
FIG. 4 is a flowchart showing an example method of managing a read cache for an eventually-consistent data store.

FIG. 4 shows an example method 400 that may be carried out in connection with the environment 100. The method 400 is typically performed, for example, by the software constructs described in connection with FIG. 1, which reside in the memory 130 of the server computer 120 and are run by the set of processors 124. The various acts of method 300 may be ordered in any suitable way. Accordingly, embodiments may be constructed in which acts are performed in orders different from that illustrated, which may include performing some acts simultaneously.

At 410, the read cache 150 is directed to store multiple data elements 152 backed by persistent storage 180. For example, in response to read requests 146a from the software program 132, the read cache 150 fetches requested data from the persistent storage 180 and places the fetched contents in data elements 152. The read cache 150 is configured to invalidate each of the data elements 152 upon expiration of a respective timer 154 provided for the respective data element 152.

At 420, a software application 132 running on a server computer 120 issues a read request 146a to the read cache 150 to read a specified data element 152. The read request returns (i) the specified data element 152 and (ii) a remaining TTL (time to live) of the specified data element 152 in the read cache 150 as indicated by the timer 154 for the specified data element 152.

At 430, the software application performs a testing operation configured to (i) produce a first result 144a in response to the remaining TTL of the specified data element 152 being less than a predetermined value 142 and (ii) produce a second result 144b in response to the remaining TTL for the specified data element 152 being greater than the predetermined value 142.

At 440, in response to the testing operation producing the first result 144a, an early-refresh instruction 146c is issued to the read cache 150. The early-refresh instruction 146c is configured to refresh the specified data element 152 with fresh contents from the persistent storage 180 prior to expiration of the timer 154 for the specified data element 152.

An improved technique has been described for managing a read cache 150 in an eventually-consistent data store 116. The technique includes, in response to a read request 112a for a specified data element 152, receiving the specified data element 152 from the read cache 150 as well as a remaining TTL (time to live) of the data element 152, as indicated by a timer 154 for that data element 152 in the read cache 150. If the remaining TTL falls below a predetermined value 142, the technique triggers an early refresh 146c of the specified data element 152, prior to its expiration. As a result, later-arriving read requests to the same data element 152 which arrive before the data element 152 has been refreshed experience cache hits, as the data element 152 has not expired, thus avoiding the need to perform their own time-consuming refresh operations. The overall result is greater consistency in response times to read requests, as the number of read requests that trigger cache refreshes is greatly reduced.

Having described certain embodiments, numerous alternative embodiments or variations can be made. For example, although embodiments have been described in connection with distributed data stores, this is merely an example, as data stores need not be distributed to benefit from the improvements hereof.

Also, although certain entities, such as the software program 132 and the read cache 150, have been described as performing certain acts, such acts may be performed by other entities. For example, acts performed by the software program 132 may, in some cases, alternatively be performed by the read cache 150, and vice-versa.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIG. 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing a read cache for an eventually-consistent data store, the method comprising:
   directing the read cache to store multiple data elements backed by persistent storage, the read cache configured to invalidate each of the data elements upon expiration of a respective timer provided for the data element;
   issuing, by a software application running on a server computer, a read request to the read cache to read a specified data element, the read request returning (i) the specified data element and (ii) a remaining TTL (time to live) of the specified data element in the read cache as indicated by the timer for the specified data element;

performing, by the software application, a testing operation configured to (i) produce a first result in response to the remaining TTL of the specified data element being less than a predetermined value and (ii) produce a second result in response to the remaining TTL for the specified data element being greater than the predetermined value;

in response to the testing operation producing the first result, issuing an early-refresh instruction to the read cache, the early-refresh instruction configured to (i) refresh the specified data element with fresh contents from the persistent storage prior to expiration of the timer for the specified data element and (ii) establish an early-refresh lock, and after issuing the early-refresh instruction but prior to the specified data element being refreshed in the read cache, issuing, by the software program, a set of additional read requests to the read cache for the specified data element, each of the set of additional read requests being prevented from completing an early-refresh instruction as long as the early-refresh lock remains active.

2. The method of claim 1, further comprising, in response to issuing each of the additional read requests, receiving, by the software program, the specified data element from the read cache before having refreshed the specified data element in the read cache from the persistent storage.

3. The method of claim 2 wherein issuing the early-refresh instruction to the read cache causes the timer for the specified data element to be reset.

4. The method of claim 3, wherein the timer for the specified data element has an initial TTL from which the timer counts down, and wherein the predetermined value is based on a TTL greater than zero and less than the initial TTL.

5. The method of claim 4, further comprising explicitly releasing the early-refresh lock after the specified data element has been refreshed with fresh contents from the persistent storage.

6. The method of claim 5, further comprising storing the early-refresh lock as a data element in the read cache, the data element having a lock timer, the early-refresh lock configured to release automatically upon expiration of the lock timer.

7. The method of claim 6, wherein the software program accesses the specified data element from the read cache using a key, and wherein the method further comprises establishing a key for the early-refresh lock based on the key for the specified data element.

8. The method of claim 3, wherein issuing the read request by the software program is performed in response to receipt of a data request from a client machine coupled to the server computer over a network, and wherein the method further comprises returning, to the client machine in response to the data request, the specified data element received in response to the read request.

9. The method of claim 3, wherein issuing the read request by the software program is performed in response to receipt of a data request from a client machine coupled to the server computer over a network, and wherein the method further comprises:

receiving, by the software program, the fresh contents of the specified data element from the persistent storage; and returning, to the client machine, the fresh contents of the specified data element in response to the data request.

10. The method of claim 1 wherein issuing the early-refresh instruction to the read cache causes the timer for the specified data element to be reset prior to its expiration.

11. A computerized apparatus, comprising control circuitry that includes a set of processors coupled to memory, the control circuitry constructed and arranged to:

direct the read cache to store multiple data elements backed by persistent storage, the read cache configured to invalidate each of the data elements upon expiration of a respective timer provided for the data element;

issue, by a software application running on a server computer, a read request to the read cache to read a specified data element, the read request returning (i) the specified data element and (ii) a remaining TTL (time to live) of the specified data element in the read cache as indicated by the timer for the specified data element;

perform, by the software application, a testing operation configured to (i) produce a first result in response to the remaining TTL of the specified data element being less than a predetermined value and (ii) produce a second result in response to the remaining TTL for the specified data element being greater than the predetermined value; and in response to the testing operation producing the first result, issue an early-refresh instruction to the read cache, the early-refresh instruction configured to refresh the specified data element with fresh contents from the persistent storage prior to expiration of the timer for the specified data element, wherein the control circuitry constructed and arranged to issue the read request by the software program is operative in response to receipt of a data request from a client machine coupled to the server computer over a network, and wherein the control circuitry is further constructed and arranged to return, to the client machine in response to the data request, the specified data element received in response to the read request.

12. A computer program product including a set of non-transitory, computer-readable media having instructions which, when executed by control circuitry of a computerized apparatus, cause the control circuitry to perform a method for managing a read cache for an eventually-consistent data store, the method comprising:

directing the read cache to store multiple data elements backed by persistent storage, the read cache configured to invalidate each of the data elements upon expiration of a respective timer provided for the data element;

issuing, by a software application running on a server computer, a read request to the read cache to read a specified data element, the read request returning (i) the specified data element and (ii) a remaining TTL (time to live) of the specified data element in the read cache as indicated by the timer for the specified data element;

performing, by the software application, a testing operation configured to (i) produce a first result in response to the remaining TTL of the specified data element being less than a predetermined value and (ii) produce a second result in response to the remaining TTL for the specified data element being greater than the predetermined value; and in response to the testing operation producing the first result, issuing an early-refresh instruction to the read cache, the early-refresh instruction configured to refresh the specified data element with fresh contents from the persistent storage prior to expiration of the timer for the specified data element, wherein issuing the read request by the software program is performed in response to receipt of a data request from a client machine coupled to the server computer over a network, and wherein the method further comprises:

receiving, by the software program, the fresh contents of the specified data element from the persistent storage; and returning, to the client machine, the fresh contents of the specified data element in response to the data request.

13. The computer program product of claim 12, wherein the method further comprises, after issuing the early-refresh instruction but prior to the specified data element being refreshed in the read cache:

issuing, by the software program, a set of additional read requests to the read cache for the specified data element; and in response to issuing each of the additional read requests, receiving, by the software program, the specified data element from the read cache before having refreshed the specified data element in the read cache from the persistent storage.

14. The computer program product of claim 13 wherein issuing the early-refresh instruction to the read cache causes the timer for the specified data element to be reset.

15. The computer program product of claim 14, wherein the timer for the specified data element has an initial TTL from which the timer counts down, and wherein the predetermined value is based on a TTL greater than zero and less than the initial TTL.

16. The computer program product of claim 15 wherein, when issuing the early-refresh instruction, the method further includes establishing an early-refresh lock, the early-refresh lock preventing each of the set of additional read requests from completing an early-refresh instruction as long as the early-refresh lock remains active.

17. The computer program product of claim 16, wherein the method further comprises storing the early-refresh lock as a data element in the read cache, the data element having a lock timer, the early-refresh lock configured to release automatically upon expiration of the lock timer.

18. The computer program product of claim 17, wherein the software program accesses the specified data element from the read cache using a key, and wherein the method further comprises establishing a key for the early-refresh lock based on the key for the specified data element.

* * * * *